United States Patent [19]

McDaniel

[11] Patent Number: 4,547,013
[45] Date of Patent: Oct. 15, 1985

[54] VEHICLE BUG DEFLECTOR

[75] Inventor: Thomas I. McDaniel, Aztec, N. Mex.

[73] Assignee: Tomahawk Industries, Inc., N. Mex.

[21] Appl. No.: 625,797

[22] Filed: Jun. 28, 1984

[51] Int. Cl.⁴ .............................................. B60J 1/20
[52] U.S. Cl. ...................................... 296/1 S; 296/91
[58] Field of Search ................... 296/91, 1 S; 180/68.6

[56] References Cited

U.S. PATENT DOCUMENTS

| | | | |
|---|---|---|---|
| 2,638,376 | 5/1953 | Berry | 296/91 |
| 3,815,700 | 6/1974 | Mittendorf | 296/91 |
| 4,095,835 | 6/1978 | Easor | 296/1 S |
| 4,262,954 | 4/1981 | Thompson | 296/91 |
| 4,364,596 | 12/1982 | Geisendorfer | 296/91 |
| 4,471,991 | 9/1984 | Matthias | 296/91 |

*Primary Examiner*—Robert R. Song
*Attorney, Agent, or Firm*—Harvey B. Jacobson

[57] ABSTRACT

A horizontally elongated edge upstanding panel is provided and includes front and rear sides as well as pairs of upper and lower corner portions disposed in the same plane. The panel includes a central area which is laterally offset forwardly of the aforementioned plane and the forward facing side of the panel includes generally planar upper and lower surfaces as well as generally planar opposite side surfaces convergent toward the central area of the panel member. The side surfaces are substantially vertically disposed while the upper surface is forward and downwardly inclined and the lower surface is forwardly and upwardly inclined. The forward displacement of the central area from the plane containing four corner portions of the panel is equal to approximately 1/10 the length of the panel and slightly less than the vertical height of the panel. The lower marginal edge of the panel is supported from and extends along the interface zone defined between the upper marginal portion of a vehicle forwardly facing grille area and the opposing forward marginal edge of the vehicle hood. The panel member extends across, horizontally, at least the central two thirds of the width of the vehicle from which the panel member is supported and functions to downwardly direct air incident upon the lower portion of the panel member into the grille area of the vehicle, upwardly deflect air incident upon the upper portion of the panel away from the forward hood area and to oppositely laterally outwardly direct air incident upon the opposite end portions of the panel member.

7 Claims, 3 Drawing Figures

VEHICLE BUG DEFLECTOR

BACKGROUND OF THE INVENTION

Many motor vehicles including forwardly projecting hood portions and havng forwardly facing grille areas beneath the forward marginal edges of the hood portions include windshields which are subject to bugs and/or insects of various types impacting therewith while the vehicle is being operated at speed. This is particularly true of pick-up truck windshields which are more upright than passenger car windshields. In addition, pick-up trucks have considerably greater frontal area than passenger vehicles and, accordingly, encounter more wind resistance. Therefore, a need exists for structure by which the windshields of pick-up trucks as well as other vehicles may be at least partially shielded against the impacting of bugs and insects therewith while the vehicles are being operated at speed. Further, a need also exists for structure which will be operative to reduce the wind resistance of pick-up trucks and which also serve to increase the amount of air flowing through the grille area of the pick-up truck and thus be available for cooling the radiator thereof, especially when the pick-up truck is heavily laden.

Various different forms of wind and bug deflectors including some of the general structural and operational features of the instant invention are disclosed in U.S. Pat. Nos. 3,239,267, 4,095,835, 4,131,390, 4,214,786 and 4,313,635. However, these wind and bug deflectors have not been specifically designed for use in conjunction with pick-up trucks having greater height windshields and greater inherent wind resistance than conventional passenger vehicles.

BRIEF DESCRIPTION OF THE INVENTION

The vehicle bug deflector of the instant invention has been specifically designed for use in conjunction with pick-up trucks, also it may be used to advantage on conventional passenger vehicles.

The bug deflector serves a dual function by not only deflecting bugs away from the windshield of an associated vehicle but by also reducing the resistance of wind passing over the upper portion of the vehicle and deflecting additional quantities of air into the grille area of the vehicle.

The bug deflector comprises a horizontal panel member which is generally 4 feet in length and 5 inches in height. Mounting structure is provided for mounting the deflector with the lower marginal portion thereof substantially horizontally aligned with and spaced slightly forward of the upper marginal edge of the grille area of a pick-up truck and thus with the bug deflector spaced slightly forward of the downwardly curving forward end of the hood of a pick-up truck.

The bug deflector is generally rectangular in elevation including two opposite side upper corner portions and two opposite side lower corner portions. The corner portions of the panel member are disposed in the same plane and the central area of the panel member is spaced forward of the aforementioned plane. The forward facing side of the bug deflector includes an upper surface which is forwardly and downwardly inclined and extends between the two upper corner portions of the panel members and the central area thereof, a lower surface which is forwardly and upwardly inclined and extends between the lower corner portions of the panel member and the central area thereof and a pair of forwardly convergent side surfaces each which extend between the corresponding upper and lower corner portions of the panel member and the central area thereof. Thus, the panel member is in the form of a horizontally elongated forwardly facing pyramid and functions to deflect the air incident thereon both upwardly and downwardly therefrom as well as to the outer sides thereof.

The main object of this invention is to provide a structure for deflecting bugs and insects away from the windshield of a vehicle when the vehicle is operating in speed.

Another object of this invention is to provide structure by which additional air may be deflected into the grille area of an associated vehicle for passing through the radiator thereof when the vehicle is operated at speed.

Still another object of this invention is to provide a bug and air deflector constructed in a manner whereby it may be readily mounted on different models of vehicles produced by different vehicle manufacturers.

A final object of this invention to be specifically enumerated herein is to provide an apparatus in accordance with the preceding objects and which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

DETAILED DESCRIPTION OF THE INVENTION

Referring now more specifically to the drawings, the numeral 10 generally designates a conventional form of pick-up truck including a forward grille area 12 and a hood 16 which extends rearwardly from the upper marginal edge of the grille area 12. The forward portion of the hood curves downwardly as at 18 toward the upper marginal edge of grille area 12 and the pick-up truck 10 includes a rearwardly and upwardly inclined windshield (not shown) disposed immediately rearward of the hood 16. The windshield of a pick-up truck is less inclined relative to the vertical than the windshield of a passenger vehicle and is thus greater in elevation and adds considerably to the frontal area of the pick-up area and therefore to wind resistance of the pick-up truck.

The forward grille area 12 is disposed closely forward of the usual radiator (not shown) of the pick-up truck 10 and the air passing through the radiator cannot exceed that amount passing through the grille area. Accordingly, if a portion of the air which is normally deflected away from the grille area 12 is directed thereinto, a greater quantity of air will be available for passage through the radiator.

Figure 1:
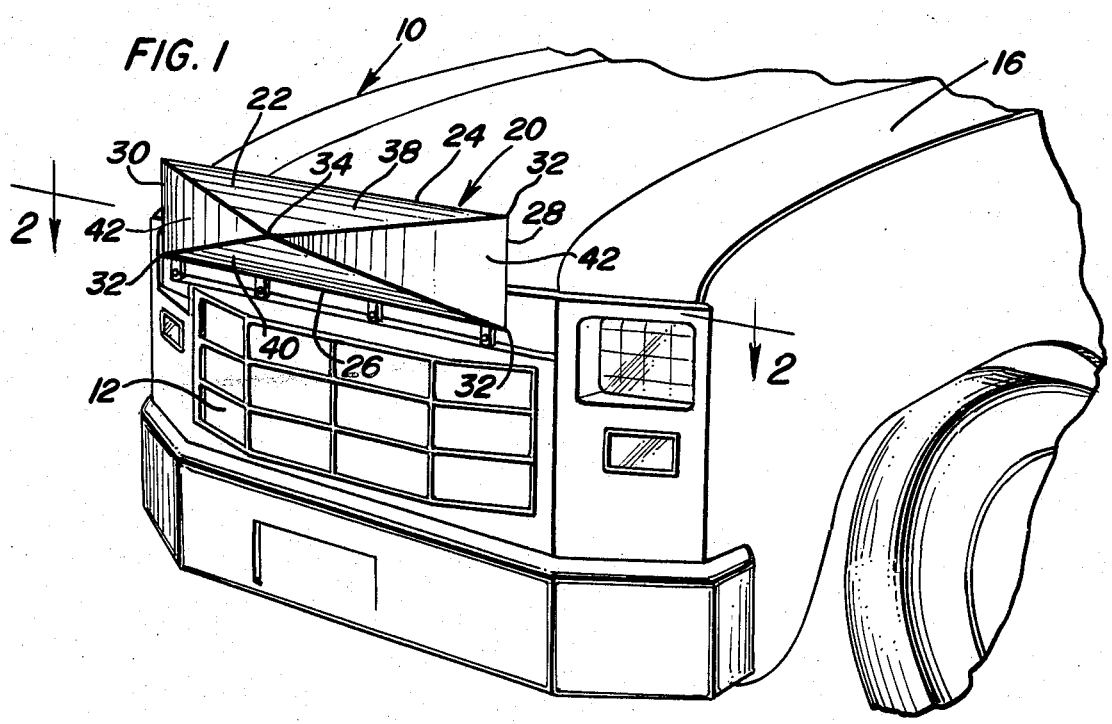
FIG. 1 is a fragmentary perspective view of the forward end of a pick-up truck and with the bug and air deflector of the instant invention mounted in operative position relative to the upper marginal portion of the forward grille area of the pick-up truck.
Figure 2:
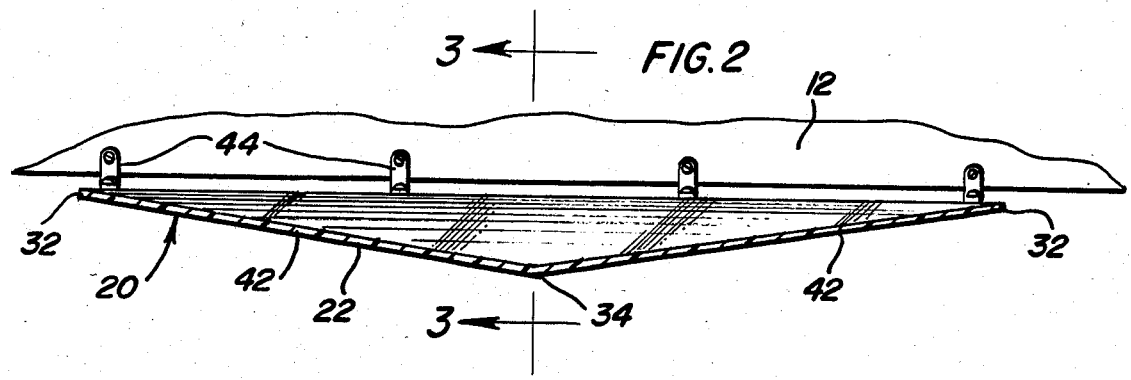
FIG. 2 is an enlarged fragmentary horizontal sectional view taken substantially upon the plane indicated by the section line 2—2 of FIG. 1.
Figure 3:
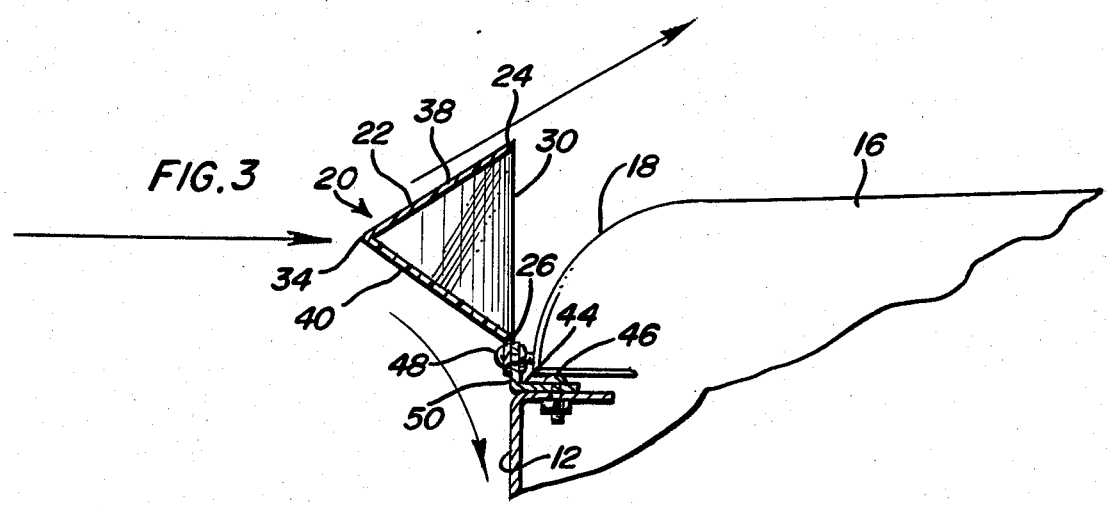
FIG. 3 is a fragmentary enlarged vertical sectional view taken substantially upon the plane indicated by the section line 3—3 of FIG. 2.

The combined air and bug deflector of the instant invention is referred to in general by the reference numeral 20 and comprises a horizontally elongated and edge upstanding generally rectangular panel member 22 including upper and lower horizontal marginal edge portion 24 and 26 and upstanding opposite end marginal edge portions 28 and 30. The panel member 32 defines four corner portions 32 disposed in the same generally vertical plane and a central area 34 laterally spaced forward of the plane containing the four corner portions 32. The horizontal length of the panel member 22 is approximately ten times the forward spacing of the central area 34 forward of the plane containing the corner portions 32 and the front side of the panel member 22 includes a forwardly and downwardly inclined upper surface 38, a forwardly and upwardly inclined lower surface 40 and forwardly convergent generally vertical opposite side surfaces 42. It may thus be seen from FIG. 1 of the drawings that the panel member 22 is in the shape of a forwardly facing and generally horizontal elongated pyramid of low height configuration.

A plurality of L-shaped mounting brackets 44 are provided and have horizontal flange portions thereof secured by fasteners 46 to transversely spaced portions of the upper margin of the grille area 12 and vertical flange portions of the brackets 44 are secured by fasteners 48 to transversely spaced portions of a depending vertical lip 50 carried by and extending along the lower marginal edge portion 26 of the panel member 22. Accordingly, the lower marginal edge portion 22 is spaced slightly above the upper marginal portion of the grille area 12 and, due to the approximately 5 inch height of the panel member 22, the upper marginal edge 24 of the panel member 22 is disposed at an elevation slightly above the forward portion of the hood 16. Also, the horizontal length of the panel member 22 is such to enable the panel member 22 to span the central ⅔ width of the vehicle 10.

In operation, air incident upon panel member 22 is directed upwardly away from the central area 34 and downwardly away from the central area 34. The upwardly directed air tends to upwardly deflect bugs and insects away from the windshield of vehicle 10 and the air deflected downwardly by the panel member 22 is directed toward the upper marginal portion of the grille area 12. In addition, the surfaces 42 laterally outwardly deflect air incident thereupon and the overall result of the use of the air deflector 20 is that the associated windshield will experience less impact of bugs and insects thereagainst, the grille area 12 (and thus the radiator) will receive more cooling air and wind resistance to forward movement of the vehicle 10 is reduced.

The panel member 22 may be constructed of transparent or translucent plastic material and may include thickened edge portions for reinforcement. Also, the height and width of the panel member 22 may be varied as desired, according to the size of the vehicle upon which the deflector 20 is to be mounted.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. In combination with a vehicle including a forward upstanding grille area having an upper marginal portion, a hood extending generally horizontally rearwardly from the upper marginal portion of said grille area and with said hood including a forward marginal portion which curves downwardly toward said upper marginal portion of said grille area, a vehicle bug deflector, said bug deflector comprising a horizontally elongated edge upstanding panel member extending transversely of said vehicle closely forward of said forward marginal edge portion, said panel member including vertically spaced generally horizontal upper and lower marginal edges and upstanding end edges extending between corresponding ends of said upper and lower marginal edges, the upper and lower end portions of said end edges intersecting with adjacent ends of said upper and lower marginal edges at four corner areas of said panel member disposed in an upstanding plane, said panel member including a central area thereof forwardly laterally spaced from said plane, the forward side of said panel member including four generally planar surfaces converging toward said central area and including an upper surface extending between and interconnecting the two upper corner portions of said panel member and said central area, a lower surface extending between and connecting the two lower corners and said central area and a pair of opposite side surfaces each extending between and connecting the corresponding upper and lower corners of said panel member and said central area, and means supporting said panel member from said vehicle with the lower marginal edge portion of said panel member extending along and spaced slightly forward of said forward marginal portion.

2. The deflector of claim 1 wherein said means supporting said deflector from said vehicle includes angle bracket means secured to said upper marginal portion of said grille area and the lower margin of said panel member.

3. The deflector of claim 2 wherein said lower marginal portions of said deflector includes a depending vertical flange portion comprising said lower margin.

4. The deflector of claim 1 wherein said panel member is of a horizontal length approximately equal to ⅔ the width of said vehicle and is centered transversely relative to said vehicle.

5. The deflector of claim 4 wherein said panel member is approximately 5 inches in height.

6. The deflector of claim 1 wherein the forward lateral offset of said central portion is generally equal to the height of said panel member.

7. The deflector of claim 1 wherein said panel member is constructed of plastic.

* * * * *